(12) United States Patent
Riley et al.

(10) Patent No.: US 10,047,730 B2
(45) Date of Patent: Aug. 14, 2018

(54) HIGH-TEMPERATURE THERMAL ACTUATOR UTILIZING PHASE CHANGE MATERIAL

(71) Applicant: Woodward, Inc., Fort Collins, CO (US)

(72) Inventors: Michael B. Riley, Fort Collins, CO (US); James Ambrosek, Fort Collins, CO (US); Kumaresh Gettamaneni, Wellington, CO (US); Nolan Polley, Longmont, CO (US); R. J. Way, Fort Collins, CO (US)

(73) Assignee: Woodward, Inc., Fort Collins, CO (US)

(*) Notice: Subject to any disclaimer, the term of this patent is extended or adjusted under 35 U.S.C. 154(b) by 1527 days.

(21) Appl. No.: 13/801,734

(22) Filed: Mar. 13, 2013

(65) Prior Publication Data

US 2014/0102544 A1    Apr. 17, 2014

Related U.S. Application Data

(60) Provisional application No. 61/712,939, filed on Oct. 12, 2012.

(51) Int. Cl.
*G05D 23/02* (2006.01)
*F03G 7/06* (2006.01)
*B23P 19/00* (2006.01)

(52) U.S. Cl.
CPC ............ *F03G 7/06* (2013.01); *B23P 19/00* (2013.01); *G05D 23/026* (2013.01); *G05D 23/02* (2013.01);

(Continued)

(58) Field of Classification Search
CPC ........ F03G 7/06; G05D 23/02; G05D 23/021; G05D 23/022; G05D 23/023
(Continued)

(56) References Cited

U.S. PATENT DOCUMENTS 2,931,390 A * 4/1960 Vernet .................. G05D 23/022
                                                          236/93 A
2,966,062 A   12/1960 Eskin et al.
(Continued)

FOREIGN PATENT DOCUMENTS

WO      8707630       12/1987
WO     2006053405      5/2006
(Continued)

OTHER PUBLICATIONS

LaPointe, Bob. Physical Properties of Plastics. Jun. 8, 2011, members.tm.net/lapointe/Plastics2.html.*
(Continued)

*Primary Examiner* — Jonathan Bradford
(74) *Attorney, Agent, or Firm* — William W. Cochran; Cochran Freund & Young, LLC

(57) ABSTRACT

Disclosed is a high-temperature thermal actuator that utilizes the dimensional change of a phase change media hermetically sealed within a shell. This actuator regulates and controls flow of a fluid between an intake and an exhaust utilizing a valve. In one example, the disclosed embodiments operate in temperature range between 350° C. and 400° C. This actuation range is tailored for specific applications utilizing an exemplary combination of $RbNO_3$ and $CsNO_3$ in precise proportion that provides operation within this range.

32 Claims, 13 Drawing Sheets

(52) U.S. Cl.
CPC ......... *G05D 23/022* (2013.01); *G05D 23/025* (2013.01); *Y10T 29/49826* (2015.01); *Y10T 137/0391* (2015.04)

(58) Field of Classification Search
USPC .............................................. 236/100, 101 R
See application file for complete search history.

(56) References Cited

U.S. PATENT DOCUMENTS

| | | | |
|---|---|---|---|
| 3,131,563 A | 5/1964 | Britton | |
| 3,533,552 A * | 10/1970 | Scherer | G05D 23/022 236/34 |
| 3,966,354 A | 6/1976 | Patterson | |
| 4,023,731 A | 5/1977 | Patterson | |
| 4,075,845 A | 2/1978 | Allen | |
| 4,183,466 A | 1/1980 | Dreibelbis | |
| 4,273,183 A | 6/1981 | Altoz et al. | |
| 4,965,545 A | 10/1990 | Johnson | |
| 5,025,627 A | 6/1991 | Schneider | |
| 5,119,555 A | 6/1992 | Johnson | |
| 5,165,897 A | 11/1992 | Johnson | |
| 5,316,437 A | 5/1994 | Czachor | |
| 5,325,880 A | 7/1994 | Johnson | |
| 5,381,951 A * | 1/1995 | Michel | F01P 11/16 236/34.5 |
| 5,671,905 A | 9/1997 | Hopkins, Jr. | |
| 5,984,197 A * | 11/1999 | Surgarek | G05D 23/022 236/100 |
| 6,046,666 A * | 4/2000 | Ingvarsson | G05D 23/1921 236/42 |
| 6,116,852 A | 9/2000 | Pierre et al. | |
| 6,722,632 B2 * | 4/2004 | Kenny | F16T 1/02 236/56 |
| 6,729,599 B2 | 5/2004 | Johnson | |
| 7,481,055 B2 | 1/2009 | Safran | |
| 7,503,594 B2 | 3/2009 | Peacock et al. | |
| 7,522,029 B1 | 4/2009 | Lantz | |
| 7,755,899 B2 | 7/2010 | Stenmark | |
| 7,757,716 B2 | 7/2010 | Welle | |
| 7,987,914 B2 | 8/2011 | Benton | |
| 2006/0141308 A1 | 6/2006 | Becerra et al. | |
| 2006/0156727 A1 | 7/2006 | Jacobsen et al. | |
| 2010/0145272 A1 | 6/2010 | Cefai et al. | |
| 2011/0083431 A1 | 4/2011 | Mankame et al. | |
| 2011/0109952 A1 | 5/2011 | Frank et al. | |
| 2011/0199177 A1 | 8/2011 | Lehto et al. | |

FOREIGN PATENT DOCUMENTS

| | | |
|---|---|---|
| WO | 2010008329 | 1/2010 |
| WO | 2012139013 A2 | 10/2012 |

OTHER PUBLICATIONS

International Search Report, International Searching Authority, dated Mar. 7, 2014, pp. 1-20.

* cited by examiner

HIGH-TEMPERATURE THERMAL ACTUATOR UTILIZING PHASE CHANGE MATERIAL

CROSS REFERENCE TO RELATED APPLICATION

This application is based upon and claims the benefit of U.S. provisional application No. 61/712,939, entitled "High-Temperature Thermal Actuator Utilizing Phase Change Material", filed Oct. 12, 2012, the entire disclosure of which is hereby specifically incorporated by reference for all that it discloses and teaches.

BACKGROUND OF THE INVENTION

In numerous high temperature applications control devices are required to switch between various states at given temperatures, or temperature ranges. These devices may be active or passive. An example of a passive low temperature device is an automotive thermostat, which typically operates below 130° C. These thermostats may utilize wax pellets whose composition is chosen for the temperature range to be served. Other passive devices may include bimetallic strips, whose temperature affected shape change is utilized to facilitate a physical actuation.

These designs are only viable at low temperature. Currently, there are no passive, high temperature thermostats capable of applying sufficient mechanical force with reliable operation above approximately 200° C. Bimetallic thermostats are most often used with active electronic control where the bimetallic elements close contacts for an electric circuit. There is a need for a thermostatic control device that is operable at higher temperatures and is capable of providing sufficient actuation force.

SUMMARY OF THE INVENTION

An embodiment of the present invention may therefore comprise: a high-temperature thermal actuator comprising: a sealed volumetric confine comprising: a flexible metal wall with planar surfaces orthogonal to an axial orientation that allows flexural displacement towards the outside of the confine; an opposing wall with planar surfaces orthogonal to an axial orientation, approximately parallel to, and offset by, a distance from the flexible wall; at least one non-flexible wall that is disposed in a circumferential orientation to engage the flexible metal wall and the opposing wall thereby forming the sealed confine; a phase change media located within the volume of the confine, the phase change media that expands upon a change of state from solid to liquid as the temperature of the phase change media increases beyond 200° C.; and, an actuator rod in contact with an outside surface of the flexible metal wall that changes distance from the opposing wall in response to the change of state of the phase change media.

An embodiment of the present invention may also comprise: a high-temperature thermal actuated valve comprising: a high-temperature thermal expansion module comprising: a sealed volumetric confine comprising: a flexible metal wall with planar surfaces orthogonal to an axial orientation that allows flexural displacement towards the outside of the confine; an opposing wall with planar surfaces orthogonal to an axial orientation, approximately parallel to, and offset by, a distance from the flexible wall; at least one non-flexible wall that is disposed in a circumferential orientation to engage the flexible metal wall and the opposing wall thereby forming the sealed confine; and, a phase change media located within the volume of the confine, the phase change media that expands upon a change of state from solid to liquid as the temperature of the phase change media increases beyond 200° C.; an actuator rod in contact with an outside surface of the flexible metal wall that changes distance from the opposing wall in response to the change of state of the phase change media; and, a valve assembly in communication with the actuator rod that opens and closes in response to variations in the distance of the actuator rod from the opposing wall thereby regulating the flow of a fluid.

An embodiment of the present invention may also comprise: a method of causing displacement with a high-temperature thermal actuator comprising: providing a sealed volumetric confine comprising: a flexible metal wall with planar surfaces orthogonal to an axial orientation that allows flexural displacement towards the outside of the confine; an opposing wall with planar surfaces orthogonal to an axial orientation, approximately parallel to and offset by a distance from the flexible wall; at least one non-flexible wall that is disposed in a circumferential orientation to engage the flexible metal wall and the opposing wall thereby forming the sealed confine; providing a phase change media within the volume of the confine; heating the phase change media past a phase transition point greater than 200° C.; expanding the phase change media upon a change of state between solid and liquid; and, deflecting the metal wall away from the opposing wall and displacing an actuator rod with the force exerted by the phase change media upon the change of state.

An embodiment of the present invention may also comprise: a method of opening and closing a valve with a high-temperature thermal actuator comprising: providing a sealed volumetric confine comprising: a flexible metal wall with planar surfaces orthogonal to an axial orientation that allows flexural displacement towards the outside of the confine; an opposing wall with planar surfaces orthogonal to an axial orientation, approximately parallel to and offset by a distance from the flexible wall; at least one non-flexible wall that is disposed in a circumferential orientation to engage the flexible metal wall and the opposing wall thereby forming the sealed confine; providing a phase change media within the volume of the confine; heating the phase change media to a phase transition point greater than 200° C.; expanding the phase change media upon a change of state between solid and liquid; changing a distance between the flexible metal wall and the opposing wall with the force exerted by the phase change media upon the change of state; displacing an actuator rod with the force exerted by the changing of the distance between the deformable metal wall and the opposing wall; and, regulating the flow of a fluid by opening or closing a valve assembly that is in communication with the actuator rod in response to the displacing of the actuator rod.

An embodiment of the present invention may also comprise: a high-temperature thermal actuator comprising: a sealed volumetric confine comprising: an upper wall with planar surfaces orthogonal to an axial orientation that allows flexural displacement towards the outside of the confine; an opposing lower wall with planar surfaces orthogonal to an axial orientation, approximately parallel to, and offset by, a distance from the flexible wall; a circumferential sidewall wall comprising at least one flexible corrugated element that is disposed to engage and seal with the upper metal wall and the lower wall thereby forming the sealed confine, at least one flexible corrugated element that facilitates a preferential flexion in the axial orientation upon expansion of the sealed confine; a phase change media in located within the volume of the confine, the phase change media that expands upon a change of state from solid to liquid as the temperature of the phase change media increases beyond 200° C.; and, an actuator rod in contact with an outside surface of the flexible metal wall that changes distance from the opposing wall in response to the change of state of the phase change media.

DETAILED DESCRIPTION OF THE INVENTION

Figure 1:
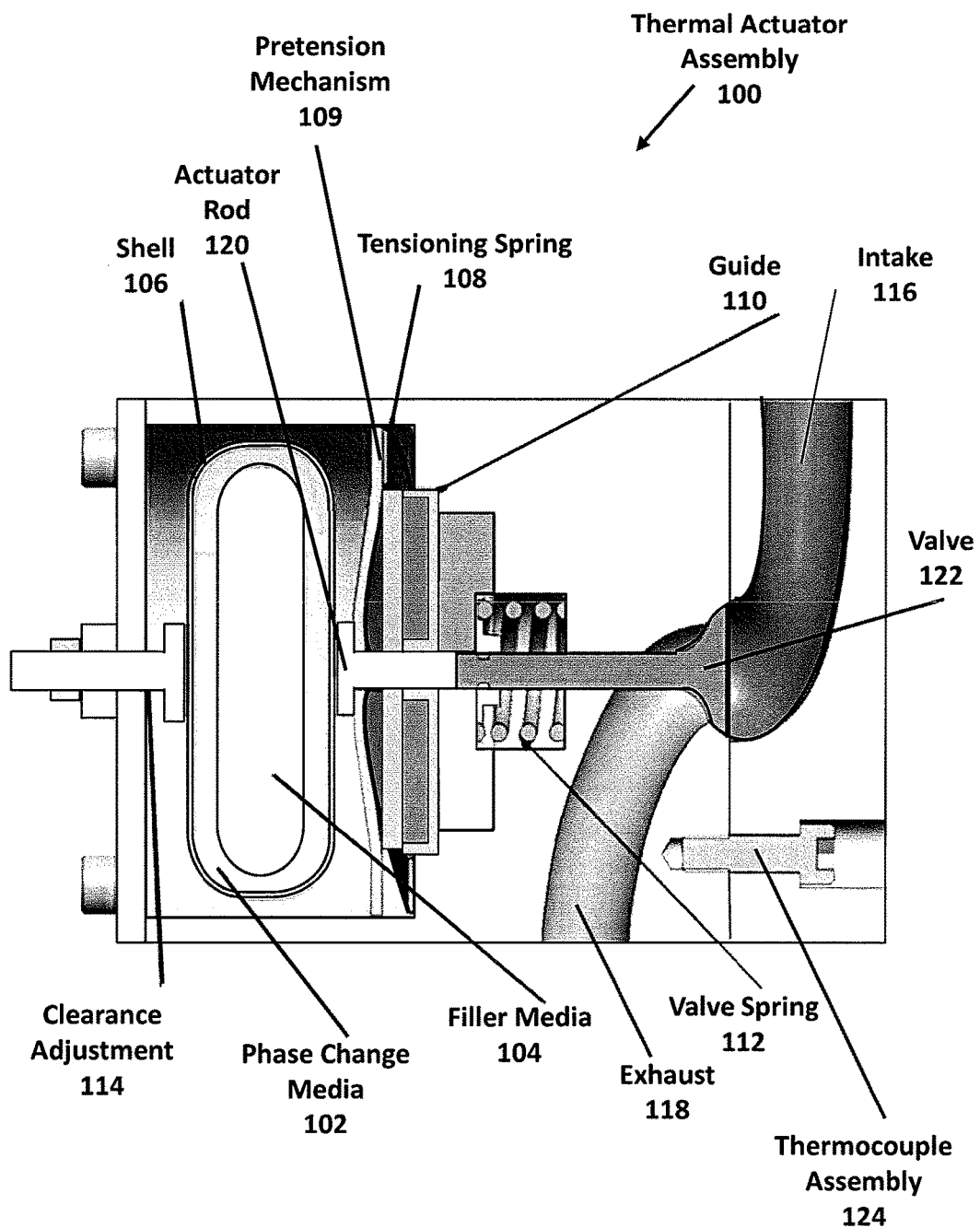
FIG. 1 illustrates an embodiment of a high-temperature thermal actuator assembly.

While this invention is susceptible to embodiment in many different forms, it is shown in the drawings, and will be described herein in detail, specific embodiments thereof with the understanding that the present disclosure is to be considered as an exemplification of the principles of the invention and is not to be limited to the specific embodiments described.

FIG. 1 is an embodiment of a high-temperature thermal actuator assembly 100. The exemplary embodiment of the actuator 100 depicted in FIG. 1 provides a device that utilizes the dimensional change of a phase change media 102, hermetically sealed within a shell 106. The shell 106 may also contain a portion of the internal structure that is filled with a filler media 104 that does not undergo a phase change, or experiences a phase change at a different temperature than the phase change media 102. In this particular embodiment, the thermal actuator 100 regulates and controls flow of a fluid (in this example, air) between an inlet 116 and an outlet 118 utilizing a valve 122.

By regulating the flow from the inlet 116 to the outlet 118 upon reaching a predetermined temperature, flow (e.g., cooling) is only provided at a specifically high temperature. When the thermal actuator 100 reaches a specific temperature, the phase change media 102 changes state (typically but not limited to solid to liquid) and in doing so increases its volume. This volumetric change increases the size of the shell 106 that changes (increases) the physical dimension between the clearance adjustment 114 piece and the actuator rod 120. This actuator rod 120 is held in place with a pretension mechanism 109 and a tensioning spring 108 that keep the rod 120 positioned snugly against the shell 106 utilizing a guide 110. The opposing end of the actuator rod 120 contacts the valve 122 which acts to open or close a seal between the inlet 116 and the outlet 118. The valve is held in a normally closed position against the actuator rod 120 with a valve spring 112.

When the system is at a temperature below the phase change point of the phase change media 104, the system is as shown in FIG. 1, and the valve 122 is closed. In this condition, there is no flow of fluid between the inlet 116 and the outlet 118. Upon reaching a pre-determined temperature established by the phase change material (PCM) formulation, the media 102 changes phase (e.g., solid to liquid), expands, forces the actuator rod to overcome the force of the pretension mechanism 109 and a tensioning spring 108, exert force on the valve 122 that moves when the valve spring 112 force is overcome, and the valve opens. In this state, the intake air flows to the exhaust.

Utilizing a shell 106 (with filler media 104 and possible pre-tension mechanism 109 and a tensioning spring 108) enclosed in a housing that includes a simple mechanical clearance adjustment 114, ensures that the valve 122 is not lifted off its seat prior to the thermal actuator 100 reaching its intended operating temperature. The example shown here is for a puck approximately 75 mm in diameter. Displacement in this case is direct. The system may be scaled appropriately to achieve the desired (direct) displacement and alternative means may be employed to amplify the displacement if required.

In this example, the valve must operate in environments where temperatures are between 300° C. and 400° C. (it is contemplated that wider ranges of temperature may be utilized and fall within the scope of the disclosure, e.g., 200° C.-1000° C., 300° C.-1000° C., 400° C.-1000° C., 500° C.-1000° C., etc.). Thus, the system in this instance may be tailored to open between 350° C. and 375° C. Because these high temperatures make it impossible to use conventional electronics, and other solutions, and because placing actuators outside the affected area with either mechanical or hydraulic/pneumatic actuation is expensive and impractical, the disclosed system creates a self-contained, passive actuator that can be tailored to provide a range of stroke capability (e.g., from 0.5 mm to 30 mm or optionally utilizing mechanical amplification to increase the actuation length). The temperature range may be within 200° C.-1000° C., with repeatable actuation and be tunable to allow accurate temperature actuation. The system, as disclosed, is capable of providing large actuation forces with a long life cycle at relatively low cost.

Specific usage constraints are easily addressed with the aforementioned system. In various applications, such as hot or cold climates/environments, the activation (phase change) temperatures may be shifted to an optimal point by varying the formulation of the phase change media 102. This provides a great advantage over conventional low-temperature thermostatic valves that are driven by bimetallic elements, low temperature paraffin filled pistons or thermocouples.

Figure 2:
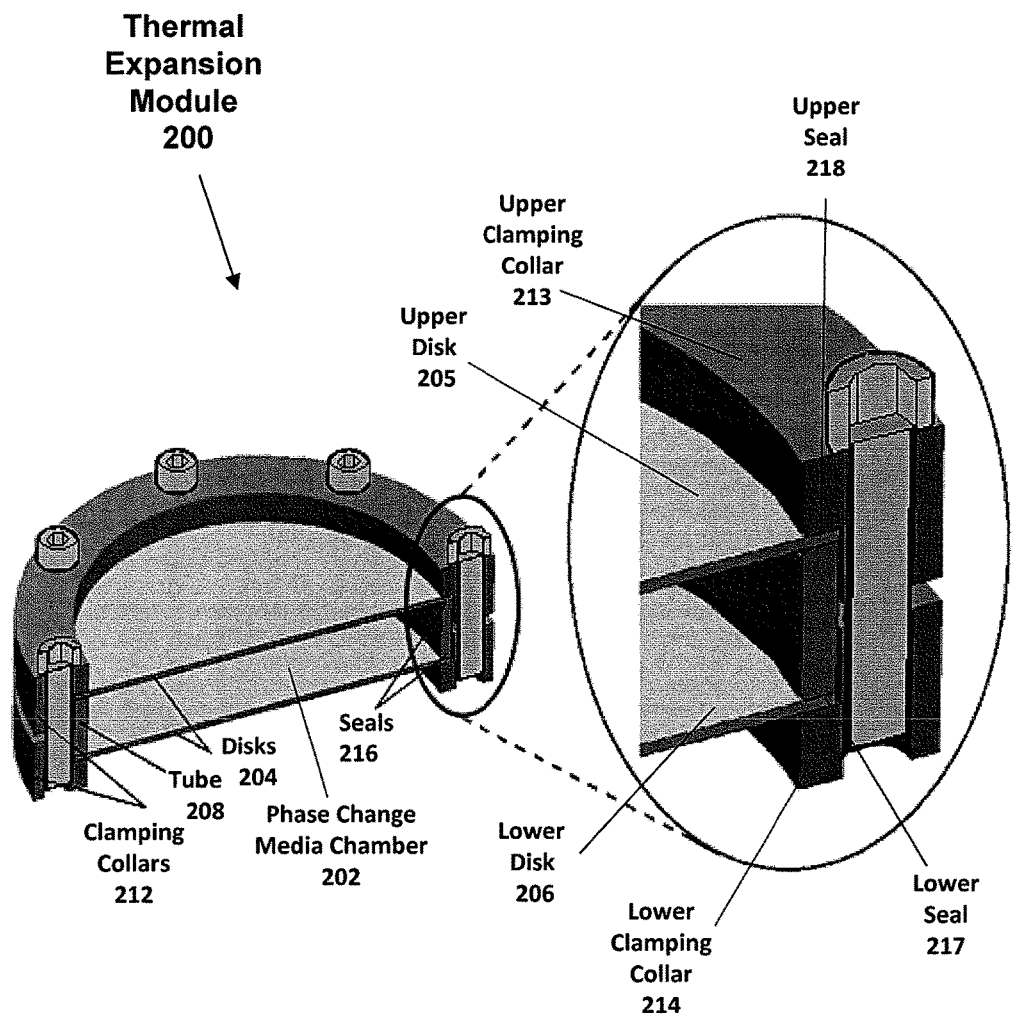
FIG. 2 illustrates an embodiment of a thermal expansion module for a high-temperature thermal actuator.

FIG. 2 is an exemplary embodiment of a thermal expansion module 200 for a high-temperature thermal actuator. As shown in FIG. 2, a phase change media is disposed within the sealed confines of a thermal expansion module 200 and acts to exert dimensional force in at least one direction in response to a temperature change that causes the media to undergo a change in phase. This change in phase may be solid-to-liquid, liquid-to-solid, liquid-to-gas, solid-to-gas, or a change in the crystalline arrangement within the material that causes a volumetric or dimensional change in the material in response to a change in temperature that is beyond thermal expansion. The module 200 in this example consists of two essentially planar metal disks 204 (they may be flat or corrugated) that are sandwiched between two constraining circular metal sections, with a configurable pipe section in between to form a "puck".

The phase change media is placed within a phase change media chamber 202 that is bound in this example by disks 204 on what is shown as an upper and lower portion, and circumferentially bound by a tube 208 with seals 216. The tube 208 is sealed to an upper disk 205 with an upper seal 218, and the tube 208 is sealed to a lower disk 206 with a lower seal 217. The components of the phase chamber media chamber 202 are held in compression with clamping collars 212. An upper clamping collar 213 receives a series of circumferential fasteners (shown here as pass through bolts) that hold and compress the disks 208 and tube in place with a lower clamping collar 214 (shown here with threaded screw holes). In this configuration, the circumferential forces caused by the expanding phase change media are tightly opposed by the tube 208 held by the clamping collars 212. With the hoop stress abated, the expansion is realized in an axial direction producing a controlled, repeatable and reliable displacement in that can be used for actuation. In this particular embodiment, the actuation is the displacement of a normally closed valve to an open state at a specific predetermined temperature or across a specific predetermined temperature range.

As shown in the embodiments of FIGS. 1 and 2, the thermal expansion module could be fabricated so that it is sealed with the puck in slight compression, and with the phase change material in either the solid state or liquid state. This allows the phase change of the media 102 to alter the shape of the puck through the neutral state to one of extension thereby distributing the maximum principal stresses. If this approach is used, the faces of the puck would become slightly concave at room temperature. Additionally, it is shown that a filler material (filler media 104) may be utilized to allow for precise adjustment of phase change material fill volume to deliver the required deflection of the actuator, while at the same time allowing a common size and shape for the outer shell or one with suitably larger radii to distribute stresses more advantageously. Alternatively, if the puck sizing results in a larger than required displacement, the flow through the valve 122 could be limited by sizing the valve curtain area such that additional displacement does not increase the valve curtain area. Different diameter outer shells could be used for actuation ranges larger or smaller than this example. In this embodiment, the edges of the tube 208 may have a slight radius to help guide the displacement of the disk as it deforms. Similarly, the clamping collars 212 on the outside may also have a suitable radius.

In this embodiment, for a particular diameter, the height of the tube 208 defines the enclosed volume of phase change material. Different applications with different thermal requirements, and therefore, different volume expansions lend to customization of the tube height. This customization affects the dimension of only one part for each diameter, thus providing a simple manner in which to execute variations in expansion characteristics. Durability of the puck may be maintained by utilizing one or more of the following design parameters. Multiple pucks may be "stacked" to produce a cumulative additive effect whereby each individual puck contains a small volume of phase change media, thus, minimizing the deflection distance of each disk 204. Pucks of greater thickness may be utilized with variable wall thickness. By using a puck with a thicker wall at the corner radius, and a thin wall at the maximum deflection point, a smaller number of pucks are required for a given deflection. The axial length of the puck may be formed significantly longer, which would allow a much larger corner radius to mitigate stress. Additionally, corrugations or bellows may be utilized to allow for distribution of deflection over a larger number of radii or enablement of greater displacement.

Figure 3:
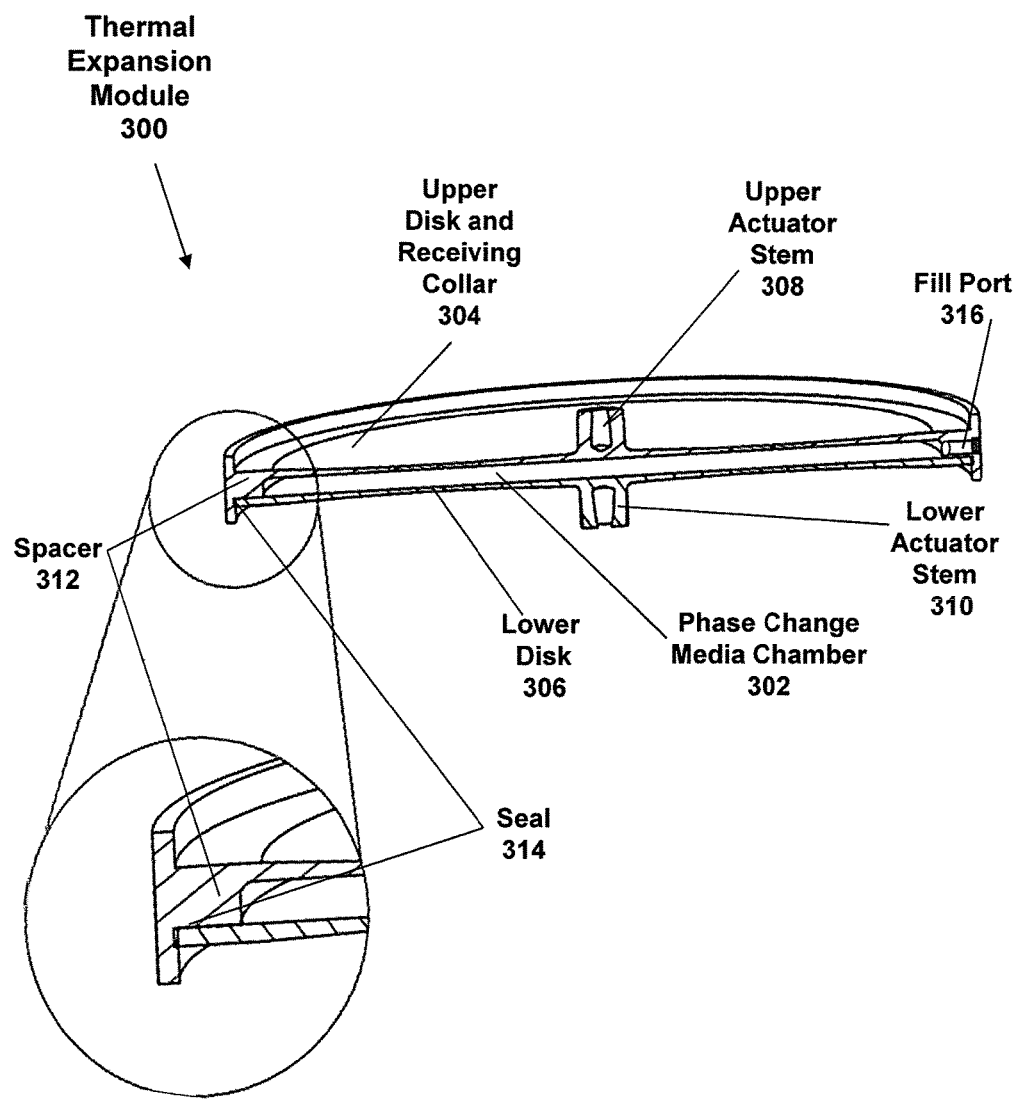
FIG. 3 illustrates another embodiment of a thermal expansion module for a high-temperature thermal actuator.

FIG. 3 is another exemplary embodiment of a thermal expansion module 300 for a high-temperature thermal actuator. As shown in FIG. 3, a phase change media is disposed within the sealed confines of a thermal expansion module 300 and acts to exert dimensional force in at least one direction in response to a temperature change that causes the media to undergo a change in phase. This change in phase may be solid-to-liquid, liquid-to-solid, liquid-to-gas, solid-to-gas or a change in the crystalline arrangement within the material that causes a volumetric or dimensional change in the material in response to a change in temperature that is beyond thermal expansion. The module 300 in this example consists of an essentially planar metal disks and receiving shell (an upper disk and receiving collar 304) and a lower disk 306. The essentially planar metal disks (which may be flat, corrugated or the like) are opposing sides of an envelope, the volume of which is defined by the radius of the disk and the spacing which is determined in this example by the spacer 312 section of the upper disk and receiving collar 304. The lower disk 306 is sealed with a seal 314 to the upper disk and receiving collar 304. This may be welded, braised, glued, press fit, or any other manner of joining that may facilitate a hermetic seal of the phase change media chamber 302.

The phase change media is placed within a phase change media chamber 302 via fill port 316 that is bound in this example by a lower disk 306 and sealed to the upper disk and receiving collar 304. With the hoop stress abated, the expansion is realized in an axial direction producing a controlled, repeatable and reliable displacement used for actuation. In this particular embodiment, the actuation is the displacement of a normally closed valve to an open state at a specific predetermined temperature (or across a specific, predetermined temperature range) between an upper actuator stem 308 and a lower actuator stem 310.

Utilizing the aforementioned examples, a stroke of 0.7 mm may be necessary to fully open the valve mechanism described in FIG. 1. Calculations indicate that a wall thickness of approximately 0.85 mm or less is required to achieve the desired 0.7 mm deflection while ensuring that the material will not fail within 1000 cycles if the zero stress case is at room temperature. The principal stresses at the location of maximum displacement may be reduced by making the wall thinner towards the center of the puck. Conversely making the curved outer boundary thicker, would reduce the stresses in this area.

Figure 4:
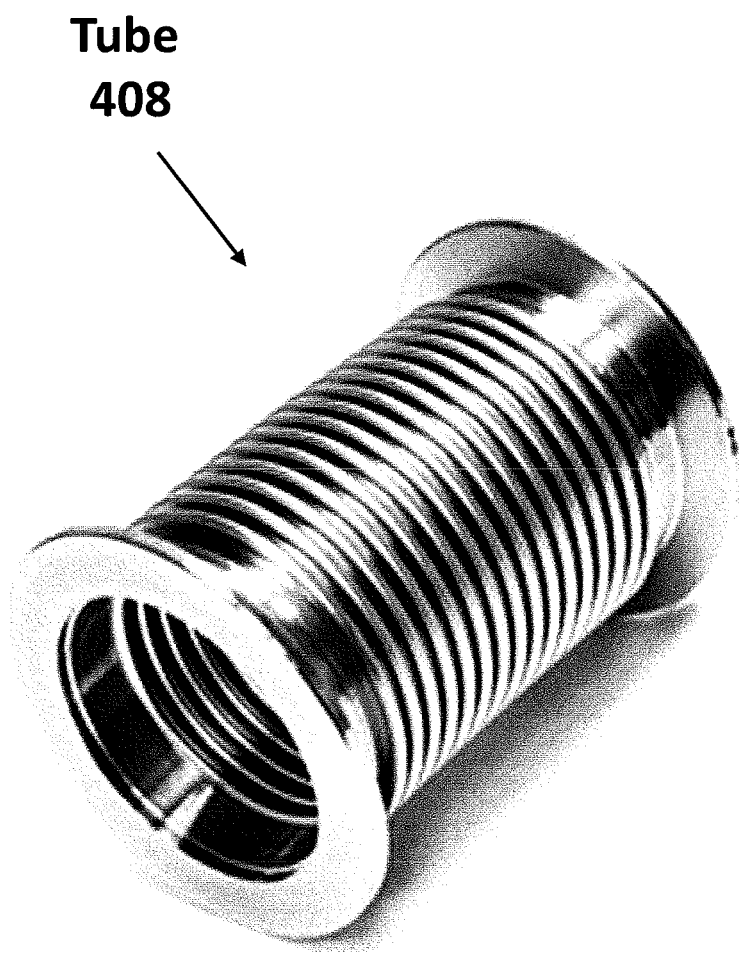
FIG. 4 illustrates an embodiment of a tube for a thermal expansion module for a high-temperature thermal actuator.

FIG. 4 is an exemplary embodiment of a tube 408 for a thermal expansion module for a high-temperature thermal actuator. As shown in FIG. 4, a corrugated tube 408 incorporating a bellows-type arrangement is used in a thermal expansion module such as detailed in FIG. 2 (see 208). This corrugated arrangement allows for greater axial expansion of the encapsulated phase change media with less bending stress.

Figure 5:
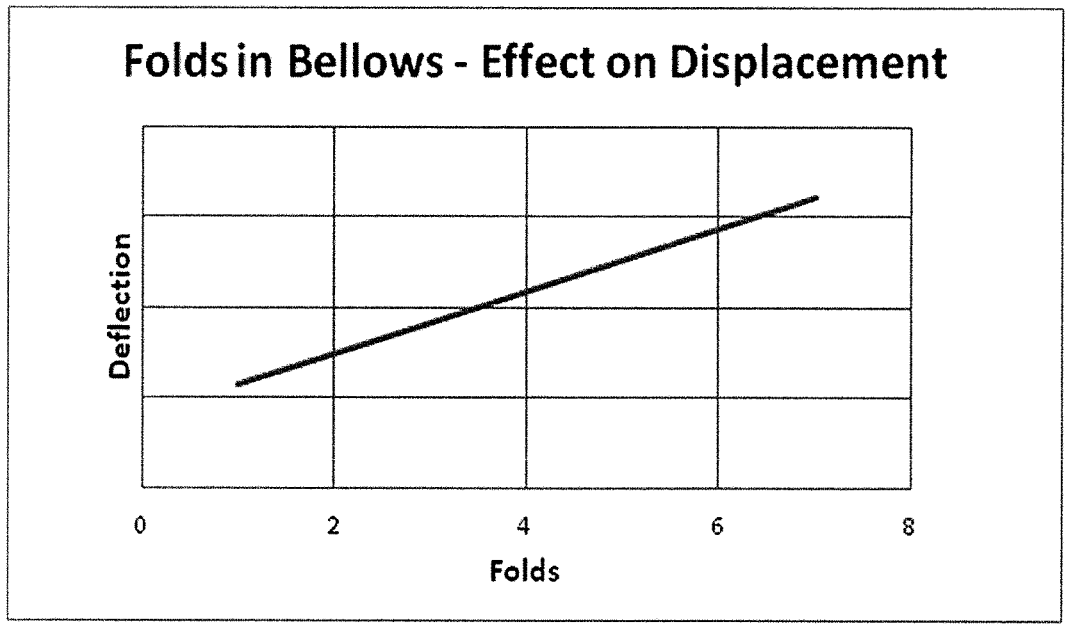
FIG. 5 is a graphical representation of the relationship between the tube geometry and deflection of a corrugated tube incorporating a bellows-type arrangement used in a thermal expansion module such as detailed in FIG. 4.

FIG. 5 illustrates a graphical representation of the relationship between the tube geometry and deflection of a corrugated tube as detailed in FIG. 4 incorporating a bellows-type arrangement that is used in a thermal expansion module, such as detailed in FIG. 2. FIG. 5 illustrates the relationship between deflection and overall length of an actuator with varying numbers of folds. As graphically detailed, with an increase in the number of folds, the maximum deflection in the puck increases.

The phase change material utilized in high-temperature applications must meet a multitude of constraints in order to meet the performance requirements of different applications. With operation temperatures in environments where temperatures are between 300° C. and 400° C. for example, the system may be tailored such that the phase change point of the media is between 350° C. and 400° C. These high temperatures make it impossible to use conventional low temperature PCM's, such as organic PCM's; paraffin, lauric acid, trimethylolethane (TME) and fatty acids; eutectic PCM's; water, glycol and the like. Inorganic PCM's, inorganic salt and salt hydrate combinations, metals, non-metals and various combinations thereof need to be blended to achieve such a material with specific thermal properties.

Inorganic salt combinations as well as additional mentioned PCM examples may provide PCM's that exhibit the property that their volume increases with the transition from solid to liquid phase. Unary (single component) PCM's make the volume change at a fixed temperature, but PCM mixture may change volume over a temperature range. The volume change realized upon melting provides application as a thermostatic actuator at temperatures that are impossible for wax pellet thermostats and bimetallic element thermostats. Specific PCM mixtures make it possible to design a range of thermostats that will open progressively over temperature ranges that may be tailored within certain constraints. Specific materials and mixtures may be used to achieve a desired application specific temperature activation ranges, these may include: inorganic salts; metals; non-metals; mixtures of metals and non-metals; or any combination thereof.

The total deflection is constrained by the need to keep stresses within acceptable limits and compatibility between the PCM and the enclosure material is a significant consideration due to corrosion issues. In addition to a tailored temperature range, melting PCM may exert enormous pressures due to the incompressibility of liquid, thereby mitigating issues regarding the actuation force required to open a valve.

Stresses within the module will occur primarily as a result of the volume change of the PCM. For the example chosen and detailed above (316 stainless steel with zero stress at room temperature, then heated to 400° C.), the stress limit for 1000 cycles is calculated to be approximately 262 MPa. This stress is based upon the greatest allowable deflection that will occur using reasonable estimates for surface finish, the effect of temperature and corrosion. If the enclosure is fabricated with the zero mean stress case being at some temperature between room temperature and the melting point (or slightly above), then the maximum principal stresses could be up to 262 MPa on either side of the unstressed state, effectively doubling the possible displacement of the actuator, although the number of cycles may be reduced.

Additionally, if the PCM solidifies with voids when pressure inside the container is lower than externally, then a spring-loaded mechanism could be applied to avoid the formation of vacuum voids. Thus, the phase change media chamber is constrained to a volume that achieves a zero stress case.

The advantages of PCM's, and in particular inorganic salts, metals and nonmetals for use in the embodiments of the disclosed thermostatic actuator include; the ability to tailor the temperature range over which the thermostat opens/closes; negligible thermal growth from room temperature to actuation temperature relative to actuation displacement; displacement can be tailored by the combination of the fractional volume change of the PCM and the enclosed volume of PCM; forces generated during the phase change process are more than enough to move most spring return valves; the system operates in vary diverse space requirements, temperature ranges and actuator displacements; and, mechanical amplification can be employed to achieve a broad range of actuation displacements.

Figure 6:
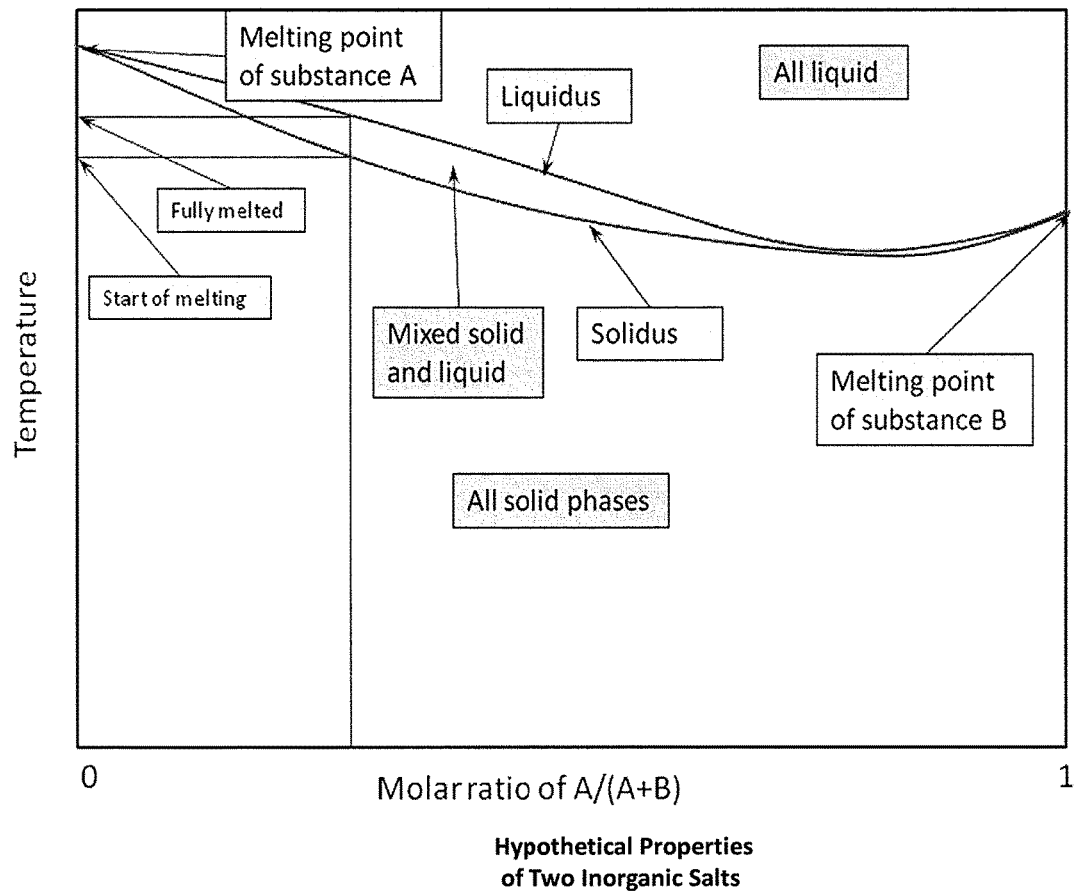
FIG. 6 is a graphical representation of the relationship between temperature and the molar concentration of various inorganic salts utilized as a phase change material.

FIG. 6 is a graphical representation of the relationship between temperature and the molar concentration of two exemplary inorganic salts. For example, in order to provide a composition that will provide actuation over a temperature range of approximately 350° C. -375° C., a molar mixture of 25% Salt A and 75% Salt B may be utilized. As is demonstrated by FIG. 6, the actuation temperature and range may be varied by molar composition, thus, readily allowing the tailoring of actuation temperature for a given application. The inorganic salt combination disclosed in FIG. 6, for example, can be varied to provide an actuation range of over 200° C. By utilizing additional combinations of inorganic salts and different molar concentrations, or by similarly tailoring other PCM's detailed above, a large temperature variation and range may be utilized.

The aforementioned description could be achieved with a combination of $RbNO_3$ and $CsNO_3$ in the correct proportions allowing operation within the range 350° C. and 400° C. As described above, a molar mixture of 25% $RbNO_3$ and 75% $CsNO_3$ would start melting at 350° C. and complete the process at 375° C. If a container of 316 stainless steel were utilized, it is possible to determine the corrosion potential from tests with similar PCM's. Research has shown that corrosion of 316 stainless steel in a mixture of $NaNO_3$ and $KNO_3$, cycled between 95° C. and 565° C., was found to be only 0.005 mm over 4000 hours. From these results, it can be estimated that a corrosion thickness of under 0.05 mm, it is reasonable to extrapolate a life of over 16 years, even with a ratio of liquid state to solid state as high as 75%.

Figure 7:
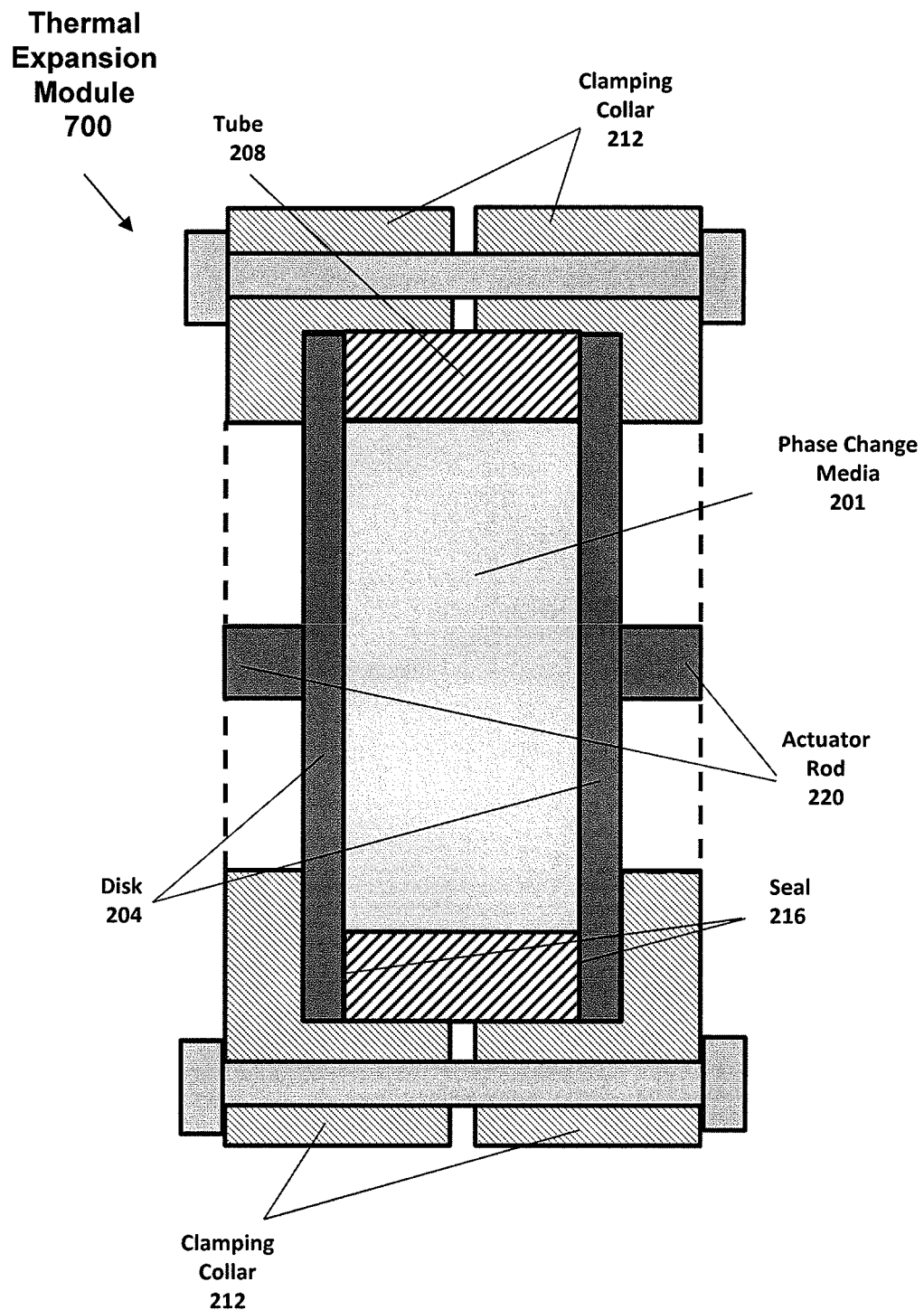
FIG. 7 is a cross sectional side-view illustrating an embodiment of a thermal expansion module for a high-temperature thermal actuator.

FIG. 7 is a cross sectional side-view of an embodiment of a thermal expansion module 700 for a high-temperature thermal actuator. As was similarly shown in FIG. 2, a phase change media 201 is disposed within the sealed confines of a thermal expansion module 700 and acts to exert dimensional force in at least one direction in response to a temperature change that causes the media to undergo a change in phase. The module 700 in this example also consists of two essentially planar metal disks 204 (they may be flat or corrugated) that are sandwiched between two constraining circular metal sections, with a configurable pipe section in between to form a "puck".

The phase change media 201 is placed within a phase change media chamber that is enclosed in this example by disks 204, and circumferentially bound by a tube 208 with seals 216 (as was shown in FIG. 2). The components of the phase chamber media chamber 202 are held in compression with clamping collars 212 held in place with a series of circumferential fasteners (shown here as pass through bolts) that hold and compress the disks 208 and tube in place with a lower clamping collar 214. In this configuration, the circumferential forces caused by the expanding phase change media are tightly opposed by the tube 208 held by the clamping collars 212. With the hoop stress abated, the expansion is realized in an axial direction producing a controlled, repeatable and reliable displacement that can be used for actuation to the actuator rod 220. As with the previous embodiments, the edges of the tube 208 may have a slight radius to help guide the displacement of the disk as it deforms. Similarly, the clamping collars 212 on the outside may also have a suitable radius.

Figure 8:
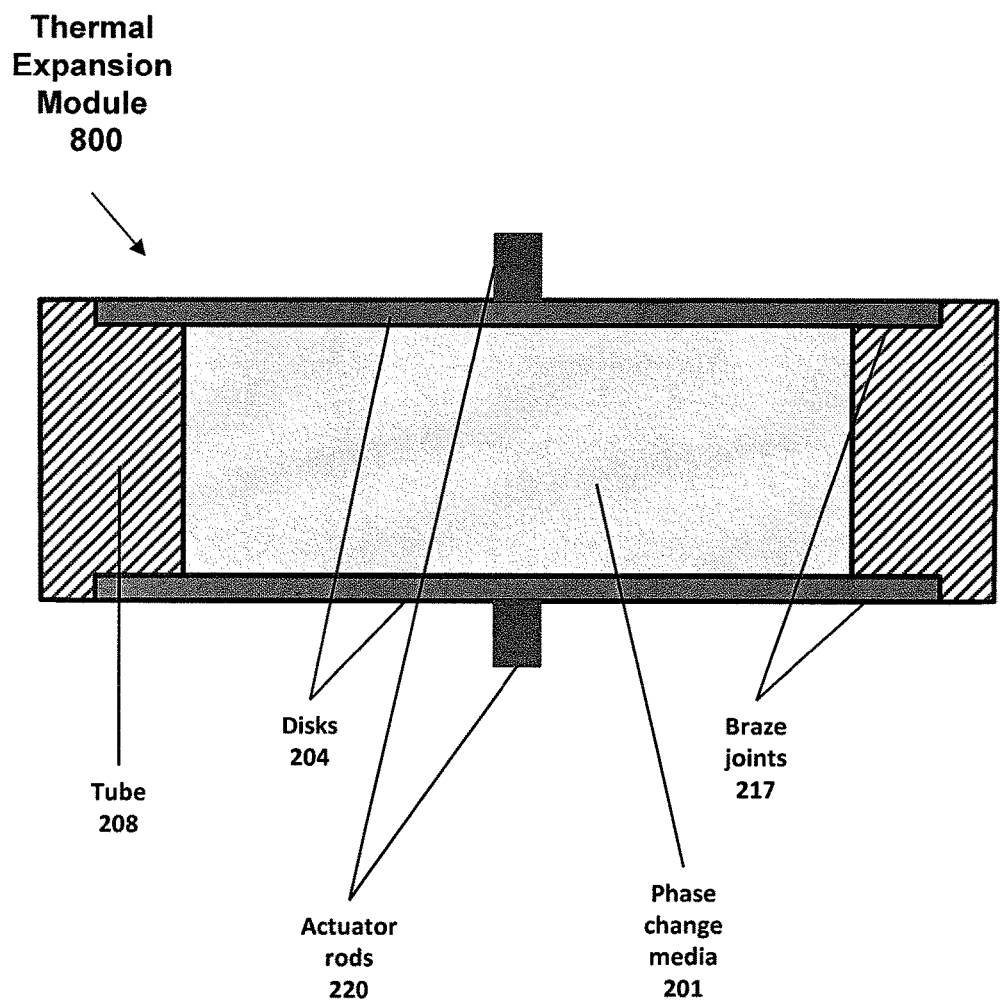
FIG. 8 is a cross sectional side-view illustrating an embodiment of a thermal expansion module for a high-temperature thermal actuator.

FIG. 8 shows another cross-sectional embodiment of a thermal expansion module 800 for a high-temperature thermal actuator, but instead of sealing the enclosure with clamping force and seals, the disks 204 have braze joints 217 (or may also be welded) to tube 208 (as was demonstrated in the embodiment detailed in FIG. 3). As was similarly shown in FIG. 2, a phase change media 201 is disposed within the sealed confines of a thermal expansion module 800 and acts to exert dimensional force in at least one direction in response to a temperature change that causes the media to undergo a change in phase. The module 800 in this example also consists of two essentially planar metal disks 204 (they may be flat or corrugated) that are sandwiched between two constraining circular metal sections, with a configurable pipe section in between to form a "puck".

Figure 9:
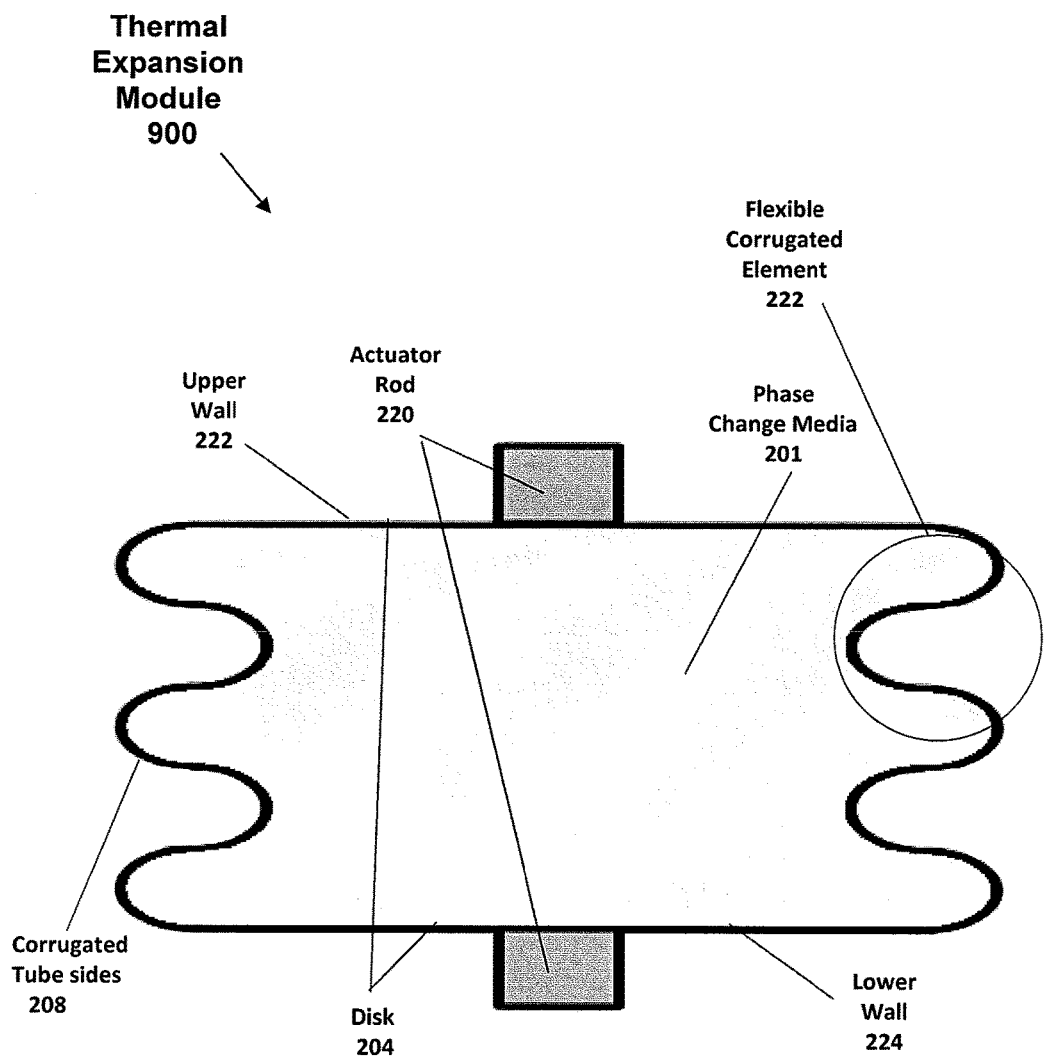
FIG. 9 is a cross sectional side-view illustrating an embodiment of a thermal expansion module for a high-temperature thermal actuator.

FIG. 9 is a cross-sectional side view of an embodiment of a bellows-style thermal expansion module 900 for a thermal actuator. In this embodiment, the circumferential rigid walls of the cylindrical container (sealed confine) are replaced with corrugated tube sides 208 made up of flexible corrugated elements 222 as were introduced in FIG. 4. Phase change media 201 may undergo a volume expansion from solid to liquid upon heating, and push disks 204 (upper wall 222 and lower wall 224) axially outwards, thus, pushing actuator rods 220 out to provide actuation motion.

Figure 10:
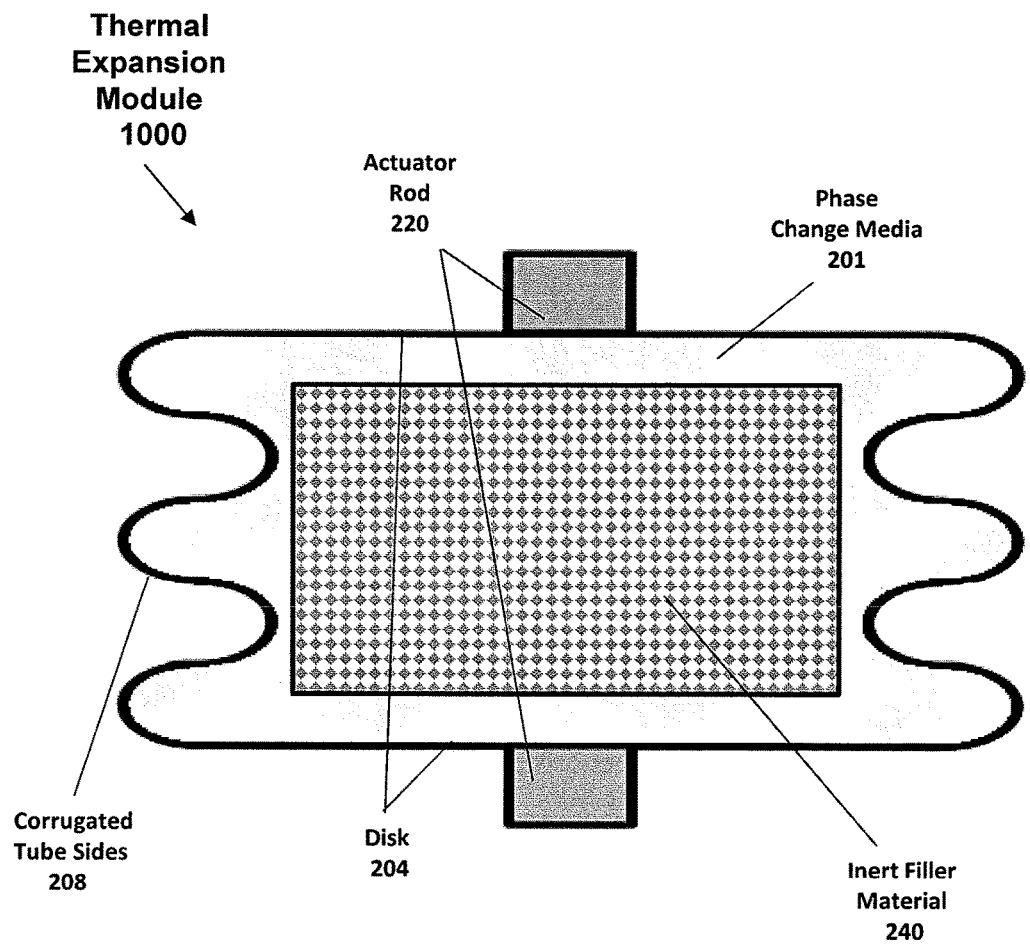
FIG. 10 is a cross sectional side-view illustrating another embodiment of a thermal expansion module for a high-temperature thermal actuator.

FIG. 10 is a cross-sectional side view of another embodiment of a bellows-style thermal expansion module 1000 for a thermal actuator incorporating inert filler material 240 within the sealed chamber. A specific mass of phase change media 201 will be required to provide the required displacement of actuator rods 220. However, if the volume contained within the puck is greater than needed, then a tailored volume of inert filler material 240 is utilized to regulate the mass of phase change media 201 added. Inert filler material 240 may be a single or multiple entities.

Figure 11:
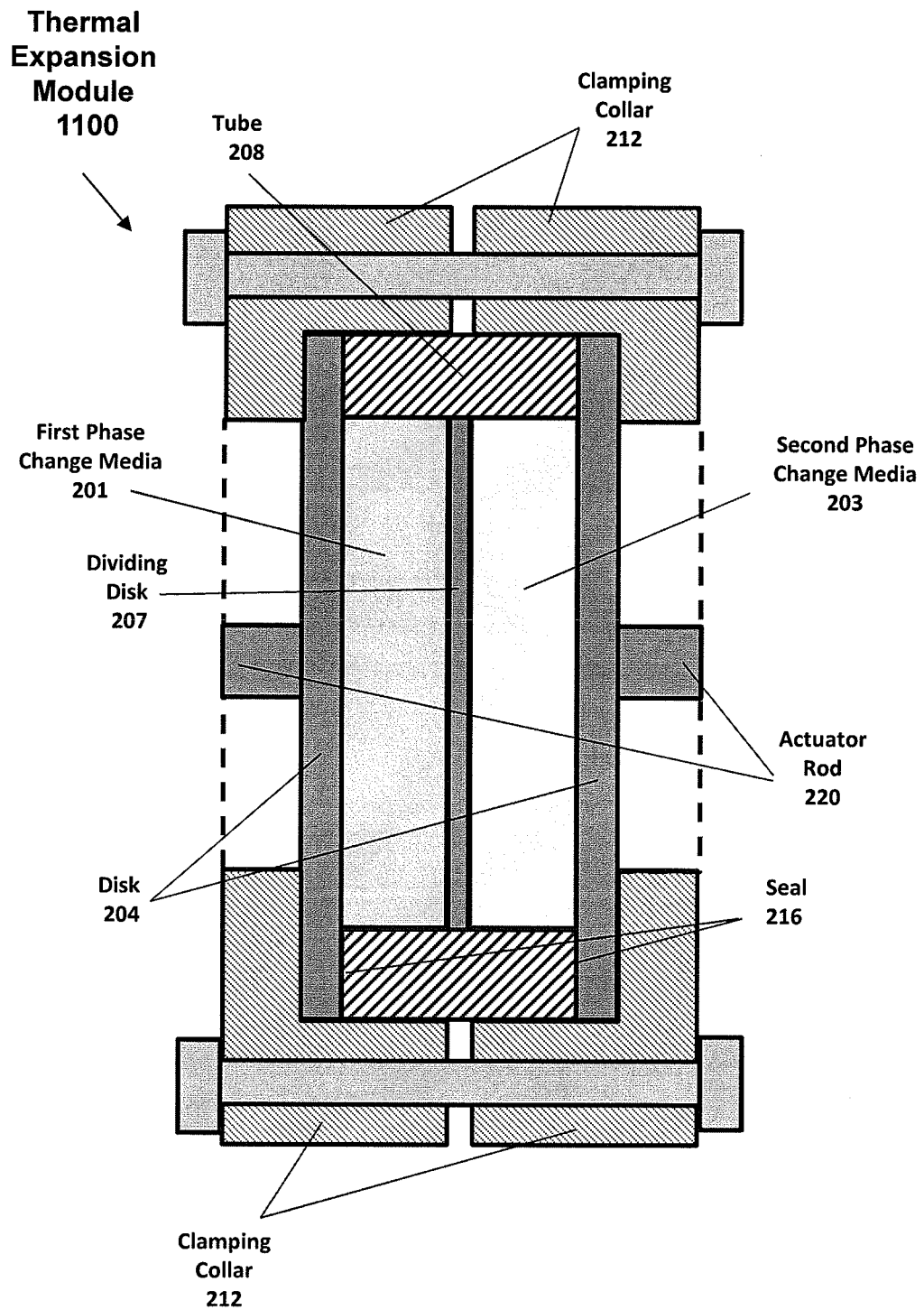
FIG. 11 is a cross sectional side-view illustrating an embodiment of a two-phase thermal expansion module for a thermal actuator.

FIG. 11 is a cross sectional side-view of an embodiment of a dual-stage thermal expansion module 1100 for a thermal actuator. In a manner similar to the embodiment in FIG. 8, two separate and distinct phase change media are utilized to produce a two position actuator. In this embodiment, a first phase change media 201 is disposed within a first sealed confine of a thermal expansion module 1100, in the same axis as a second phase change media 203 that is disposed within a second sealed confine. In this manner, each phase change media acts to exert dimensional force in at least one direction in response to temperature changes that causes the media to undergo a change in phase. In this example, a first temperature threshold causes a first phase change media 201 to expand, producing a first actuation displacement. Further temperature increase causes the second phase change media 203 to expand producing a second additive actuation displacement. In this manner, a dual actuation may be utilized for applications warranting such a situation. It is also contemplated that the first phase change media 201 and the second phase change media 203 are the same media.

Figure 12:
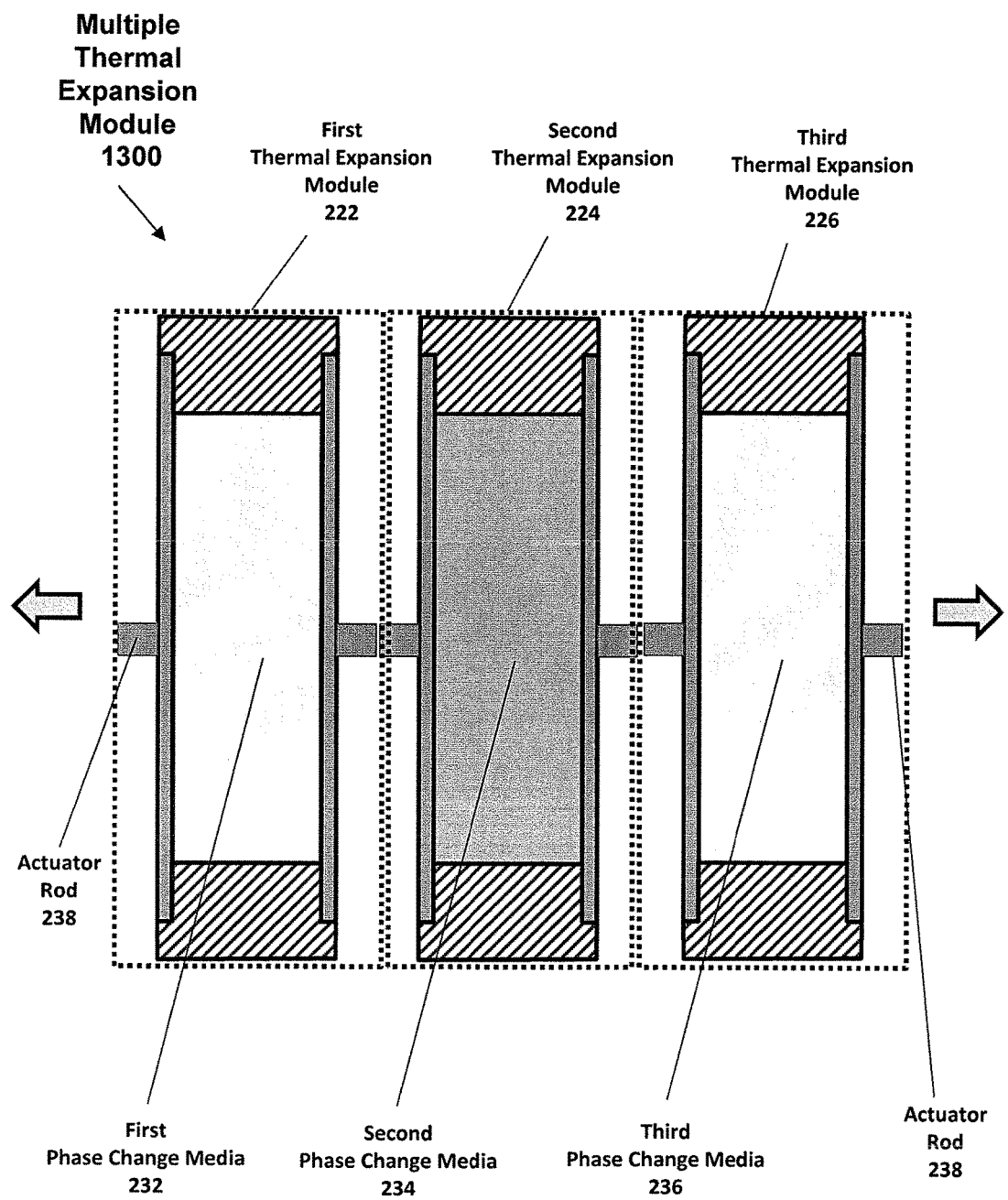
FIGS. 12 and 13 are cross sectional side-views illustrating an embodiment of a multi-phase stacked thermal expansion module for a thermal actuator.
Figure 13:
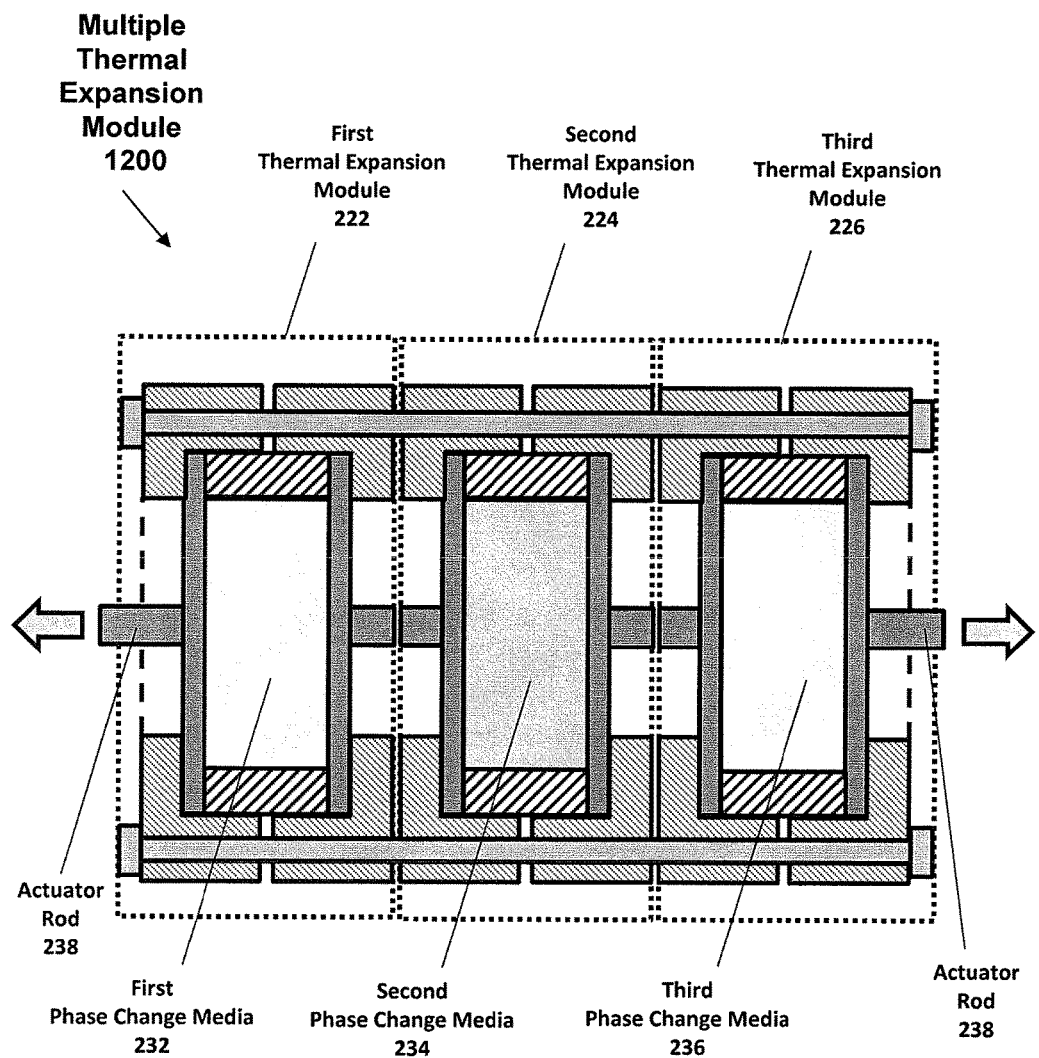

FIGS. 12 and 13 are cross sectional side-views of an embodiment of a multi-phase, stacked thermal expansion module 1200 for a thermal actuator. In a manner similar to the embodiment in FIG. 8, a plurality (in this example three) of thermal actuators with separate and distinct phase change media are stacked in series to produce a multi-position actuator. In this embodiment, a first phase change media 232 is disposed within a first sealed confine of a first thermal expansion module 222. This module is placed coaxially with a second thermal expansion module 224, containing a second phase change media 234, disposed within a second sealed confine. A third thermal expansion module 226 is also placed coaxially with the first and second modules 222, 224 and contains a third phase change media 236, disposed within a third sealed confine. In this manner, each phase change media acts to exert dimensional force in at least one direction in response to temperature changes that causes the media to undergo a change in phase. In this example, a first temperature threshold causes a first phase change media 232 to expand producing a first actuation displacement. A second temperature threshold causes the second phase change media 234 to expand producing a second additive actuation displacement, and a third temperature threshold causes the third phase change media 236 to expand, producing a third additive actuation displacement. In this manner, a multiple actuation may be utilized for applications warranting such a situation. It is also contemplated that any of the first, second and/or third PCM are the same media.

Because of the aforementioned advantages, the disclosed embodiments lend to a wide variety of applications. For example, the volume of the phase change media and/or the filler media can be tailored to produce a range of deflections (within the stress constraints) with the same outer shell and the temperature range can be tailored by the selection of the phase change media. In this manner, pucks for different temperatures and displacements can be made from relatively common components. Thus, a platform approach, with different diameters for different deflection and package constraints can be readily utilized.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The embodiments of the invention in which an exclusive property or privilege is claimed are defined as follows:
1. A high-temperature thermal actuator comprising:
  a sealed volumetric confine comprising:
    a flexible metal wall with surfaces orthogonal to an axial orientation that allows flexural displacement towards the outside of said confine;
    an opposing wall with surfaces orthogonal to an axial orientation, approximately parallel to, and offset by a distance from, said flexible wall;

at least one non-flexible wall that remains substantially rigid under operational circumstances, and that is disposed in a circumferential orientation to engage said flexible metal wall and said opposing wall thereby forming said sealed confine;

a phase change media located within wherein said volume of said confine, said phase change media expands upon a change of state from solid to liquid as the temperature of said phase change media increases beyond 200° C., wherein said phase change media does not substantially change volume due to expansion from temperature prior to said change of state from solid to liquid; and, an actuator rod in contact with an outside surface of said flexible metal wall;

wherein said actuator rod undergoes actuation displacement by being displaced when said flexible wall changes distance from said opposing wall in response to said change of state of said phase change media.

2. The high-temperature thermal actuator of claim 1 wherein said phase change media comprises one or more inorganic salts.

3. The high-temperature thermal actuator of claim 1 wherein said phase change media comprises one or more metals.

4. The high-temperature thermal actuator of claim 1 wherein said phase change media comprises one or more non-metals.

5. The high-temperature thermal actuator of claim 1 wherein said phase change media comprises any combination of one or more inorganic salts, one or more metals, and one or more non-metals.

6. The high-temperature thermal actuator of claim 1 wherein said sealed volumetric confine is a cylinder.

7. The high-temperature thermal actuator of claim 1 wherein said sealed volumetric confine contains a combination of said phase change media and an inert filler media.

8. A high-temperature thermal actuated valve comprising:
a high-temperature thermal expansion module comprising:
  a sealed volumetric confine comprising:
    a flexible metal wall with planar surfaces orthogonal to an axial orientation that allows flexural displacement towards the outside of said confine;
    an opposing wall with planar surfaces orthogonal to an axial orientation, approximately parallel to, and offset by a distance from, said flexible wall;
    at least one non-flexible wall that remains substantially rigid under operational circumstances, and that is disposed in a circumferential orientation to engage said flexible metal wall and said opposing wall thereby forming said sealed confine; and,
  a phase change media located within said volume of said confine, wherein said phase change media expands upon a change of state from solid to liquid as the temperature of said phase change media increases beyond 200° C., wherein said phase change media does substantially not change volume due to expansion from temperature prior to said change of state from solid to liquid;
an actuator rod in contact with an outside surface of said flexible metal wall, wherein said actuator rod undergoes actuation displacement by being displaced when said flexible wall changes distance from said opposing wall in response, to said change of state of said phase change media; and,
a valve assembly in communication with said actuator rod that opens and closes in response to actuation displacement of said actuator rod from said opposing wall, thereby regulating the flow of a fluid.

9. The high-temperature thermal actuated valve of claim 8 wherein at least one additional thermal expansion module is placed in series with said thermal expansion module to impart additional actuation.

10. The high-temperature thermal actuated valve of claim 9 wherein said at least one additional thermal expansion module utilizes a second phase change media that changes phase at a different temperature than said phase change media to impart additional actuation at a second temperature.

11. The high-temperature thermal expansion module of claim 8 wherein said phase change media comprises one or more inorganic salt.

12. The high-temperature thermal expansion module of claim 8 wherein said phase change media comprises one or more metals.

13. The high-temperature thermal expansion module of claim 8 wherein said phase change media comprises one or more non-metals.

14. The high-temperature thermal expansion module of claim 8 wherein said phase change media comprises any combination of one or more inorganic salts, one or more metals, and one or more non-metals.

15. The high-temperature thermal expansion module of claim 8 wherein said sealed volumetric confine is a cylinder.

16. The high-temperature thermal actuator of claim 8 wherein said sealed volumetric confine contains a combination of said phase change media and an inert filler media.

17. A method of causing displacement with a high-temperature thermal actuator comprising:
providing a sealed volumetric confine comprising:
  a flexible metal wall with planar surfaces orthogonal to an axial orientation that allows flexural displacement towards the outside of said confine;
  an opposing wall with planar surfaces orthogonal to an axial orientation, approximately parallel to and offset by a distance from said flexible wall;
  at least one non-flexible wall that remains substantially rigid under operational circumstances, and that is disposed in a circumferential orientation to engage said flexible metal wall and said opposing wall thereby forming said sealed confine;
providing a phase change media within said volume of said confine;
heating said phase change media past a phase transition point greater than 200° C., wherein said phase change media does not substantially change volume due to expansion from temperature prior to said change of state from solid to liquid;
expanding said phase change media upon a change of state between solid and liquid; and,
deflecting said metal wall away from said opposing wall and displacing an actuator rod in response to the force exerted by said phase change media upon said change of state.

18. The method of claim 17 further comprising the step:
providing said phase change media comprising one or more inorganic salts.

19. The method of claim 17 further comprising the step:
providing said phase change media comprising one or more metals.

20. The method of claim 17 further comprising the step:
providing said phase change media comprising one or more non-metals.

21. The method of claim 17 further comprising the step:
providing said phase change media comprising any combination of one or more inorganic salts, one or more metals, and one or more non-metals.

22. The method of claim 17 further comprising the step:
providing said sealed volumetric confine in the shape of a cylinder.

23. The method of claim 17 further comprising the step:
providing an inert filler media with said phase change media within said volume of said confine.

24. A method of opening and closing a valve with a high-temperature thermal actuator comprising:
providing a sealed volumetric confine comprising:
- a flexible metal wall with planar surfaces orthogonal to an axial orientation that allows flexural displacement towards the outside of said confine;
- an opposing wall with planar surfaces orthogonal to an axial orientation, approximately parallel to and offset by a distance from said flexible wall;
- at least one non-flexible wall that remains substantially rigid under operational circumstances, and that is disposed in a circumferential orientation to engage said flexible metal wall and said opposing wall thereby forming said sealed confine;

providing a phase change media within said volume of said confine;
heating said phase change media to a phase transition point greater than 200° C., wherein said phase change media does not substantially change volume due to expansion from temperature prior to said phase transition point;
expanding said phase change media upon a change of state between solid and liquid;
changing a distance between said flexible metal wall and said opposing wall with the force exerted by said phase change media due to a phase change;
displacing an actuator rod with the force exerted by said changing of said distance between said deformable metal wall and said opposing wall; and,
regulating the flow of a fluid by opening or closing a valve assembly that is in communication with said actuator rod in response to said displacing of said actuator rod.

25. The method of claim 24 further comprising the step:
providing at least one additional thermal expansion module in series with said thermal expansion module to impart additional actuation.

26. The method of claim 25 further comprising the step:
providing said at least one additional thermal expansion module utilizing a second phase change media that changes phase at a different temperature than said phase change media to impart additional actuation at a second temperature.

27. The method of claim 24 further comprising the step:
providing said phase change media comprising one or more inorganic salt.

28. The method of claim 24 further comprising the step:
providing said phase change media comprising one or more metals.

29. The method of claim 24 further comprising the step:
providing said phase change media comprising one or more non-metals.

30. The method of claim 24 further comprising the step:
providing said phase change media comprising any combination of one or more inorganic salts, one or more metals, and one or more non-metals.

31. The method of claim 24 further comprising the step:
providing said sealed volumetric confine in the form of a cylinder.

32. The method of claim 24 further comprising the step:
providing an inert filler media with said phase change media within said volume of said confine.

* * * * *